United States Patent
Shafiee Ardestani et al.

(10) Patent No.: US 11,861,327 B2
(45) Date of Patent: *Jan. 2, 2024

(54) PROCESSOR FOR FINE-GRAIN SPARSE INTEGER AND FLOATING-POINT OPERATIONS

(71) Applicant: Samsung Electronics Co., Ltd., Suwon-si (KR)

(72) Inventors: Ali Shafiee Ardestani, Santa Clara, CA (US); Joseph Hassoun, San Jose, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 311 days.

This patent is subject to a terminal disclaimer.

(21) Appl. No.: 17/131,357

(22) Filed: Dec. 22, 2020

(65) Prior Publication Data
US 2022/0147312 A1 May 12, 2022

Related U.S. Application Data

(60) Provisional application No. 63/112,271, filed on Nov. 11, 2020.

(51) Int. Cl.
*G06F 7/487* (2006.01)
*G06F 7/485* (2006.01)
(Continued)

(52) U.S. Cl.
CPC ............ *G06F 7/4876* (2013.01); *G06F 7/485* (2013.01); *G06F 7/4836* (2013.01); *G06F 7/5443* (2013.01); *G06N 3/063* (2013.01)

(58) Field of Classification Search
CPC .... G06F 7/4876; G06F 7/4836; G06F 7/5443; G06F 7/485
See application file for complete search history.

(56) References Cited

U.S. PATENT DOCUMENTS 7,428,566 B2   9/2008   Siu et al.
8,533,656 B1   9/2013   Nnaji
(Continued)

OTHER PUBLICATIONS

Lanuzza et al., "Cost-Effective Low-Power Processor-In-Memory-based Reconfigurable Datapath for Multimedia Applications", Proceedings of the 2005 International Symposium on Low Power Electronics and Design, Aug. 8, 2005. (Year: 2005).*

(Continued)

*Primary Examiner* — Michael D. Yaary
(74) *Attorney, Agent, or Firm* — Lewis Roca Rothgerber Christie LLP (57) ABSTRACT

A processor for fine-grain sparse integer and floating-point operations and method of operation thereof are provided. In some embodiments, the method includes forming a first set of products and forming a second set of products. The forming of the first set of products may include: multiplying, in a first multiplier, a first activation value by a least significant sub-word and a most significant sub-word of a first weight to form a first partial product and a second partial product; and adding the first partial product and the second partial product. The forming of the second set of products may include: multiplying, in the first multiplier, a second activation value by a first sub-word and a second sub-word of a mantissa to form a third partial product and a fourth partial product; and adding the third partial product and the fourth partial product.

20 Claims, 5 Drawing Sheets

(51) Int. Cl.
*G06F 7/544* (2006.01)
*G06F 7/483* (2006.01)
*G06N 3/063* (2023.01)

(56) References Cited

U.S. PATENT DOCUMENTS

| | | | |
|---|---|---|---|
| 9,818,059 B1 * | 11/2017 | Woo | G06N 3/0454 |
| 9,935,650 B2 | 4/2018 | Dickie | |
| 10,769,526 B2 | 9/2020 | Daga et al. | |
| 2017/0316311 A1 | 11/2017 | Pilly et al. | |
| 2019/0042198 A1 | 2/2019 | Langhammer et al. | |
| 2019/0065150 A1 * | 2/2019 | Heddes | G06F 15/8015 |
| 2019/0171927 A1 | 6/2019 | Diril et al. | |
| 2019/0228293 A1 | 7/2019 | Imber et al. | |
| 2020/0034148 A1 | 1/2020 | Sumbul et al. | |
| 2020/0051309 A1 | 2/2020 | Labbe et al. | |
| 2020/0057934 A1 | 2/2020 | Yoo et al. | |
| 2020/0117453 A1 | 4/2020 | Zhang et al. | |
| 2020/0158514 A1 | 5/2020 | Moloney et al. | |
| 2020/0160112 A1 | 5/2020 | Dennison et al. | |
| 2020/0210839 A1 | 7/2020 | Lo et al. | |
| 2020/0226444 A1 | 7/2020 | Sharma et al. | |
| 2020/0264876 A1 | 8/2020 | Lo et al. | |
| 2020/0285949 A1 | 9/2020 | Baum et al. | |
| 2020/0320375 A1 * | 10/2020 | Abuhatzera | G06N 3/0481 |
| 2020/0349106 A1 | 11/2020 | Ovsiannikov | |
| 2020/0349420 A1 | 11/2020 | Ovsiannikov et al. | |
| 2022/0147312 A1 | 5/2022 | Shafiee Ardestani et al. | |

OTHER PUBLICATIONS

Judd, P. et al., "Stripes: Bit-Serial Deep Neural Network Computing", 2016, 12 pages, IEEE.
Chen, Y. et al., "A Survey of Accelerator Architectures for Deep Neural Networks", Engineering, Jan. 29, 2020, pp. 264-274, Elsevier LTD.
"NVIDIA Deep Learning Accelerator", 4 pages, retrieved from URL: http://nvdla.org on Dec. 22, 2020.
Park, E. et al., "Energy-efficient Neural Network Accelerator Based on Outlier-aware Low-precision Computation", 2018 ACM/IEEE 45th Annual International Symposium on Computer Architecture, IEEE Computer Society, 2018, pp. 688-698, IEEE.
Unpublished U.S. Appl. No. 17/110,266, filed Dec. 2, 2020.
Unpublished U.S. Appl. No. 17/133,288, filed Dec. 23, 2020.
Zhao, R. et al., "Overwrite Quantization: Opportunistic Outlier Handling for Neural Network Accelerators", Oct. 13, 2019, 9 pages, arXiv:1910.06909v1.
U.S. Office Action dated Dec. 30, 2022, issued in U.S. Appl. No. 17/133,288 (67 pages).
U.S. Final Rejection for U.S. Appl. No. 17/133,288 dated Jun. 27, 2023, 12 pages.

* cited by examiner

PROCESSOR FOR FINE-GRAIN SPARSE INTEGER AND FLOATING-POINT OPERATIONS

CROSS-REFERENCE TO RELATED APPLICATION(S)

The present application claims priority to and the benefit of U.S. Provisional Application No. 63/112,271, filed Nov. 11, 2020, entitled "SYSTEM AND METHOD FOR IMPROVING AREA AND POWER EFFICIENCY BY REDISTRIBUTING WEIGHT NIBBLES", the entire content of which is incorporated herein by reference.

FIELD

One or more aspects of embodiments according to the present disclosure relate to processing circuits, and more particularly to a system and method for performing sets of multiplications in a manner that accommodates outlier values, and that is capable of performing both integer and floating-point operations.

BACKGROUND

Processors for neural networks may perform large volumes of multiplication and addition operations, some of which may be a poor use of processing resources because a significant fraction of the numbers being processed may be relatively small, and only a small fraction of outliers may be relatively large. Moreover, some operations in such a system may be integer operations and some may be floating point operations, which, if performed on separate respective sets of dedicated hardware may consume significant amounts of chip area and power.

Thus, there is a need for a system and method for performing sets of multiplications in a manner that accommodates outlier values and that is capable of performing both integer and floating-point operations.

SUMMARY

According to an embodiment of the present invention, there is provided a method, including: forming a first set of products, each product of the first set of products being an integer product of a first activation value and a respective weight of a first plurality of weights; and forming a second set of products, each product of the second set of products being a floating-point product of a second activation value and a respective weight of a second plurality of weights, the forming of the first set of products including: multiplying, in a first multiplier, the first activation value by a least significant sub-word of a first weight of the first plurality of weights to form a first partial product; multiplying, in a second multiplier, the first activation value by a most significant sub-word of the first weight to form a second partial product; and adding the first partial product and the second partial product, the forming of the second set of products including: multiplying, in the first multiplier, the second activation value by a first sub-word of a mantissa of a first weight of the second plurality of weights to form a third partial product; multiplying, in the second multiplier, the second activation value by a second sub-word of the mantissa to form a fourth partial product; and adding the third partial product and the fourth partial product.

In some embodiments, the second activation value is a nibble of a mantissa of a floating-point activation value.

In some embodiments, the difference between the significance of the first sub-word of the mantissa and the significance of the second sub-word of the mantissa is equal to the width of the first sub-word of the mantissa.

In some embodiments, the adding of the third partial product and the fourth partial product includes performing an offset addition in a first offset adder.

In some embodiments, the offset of the offset adder is equal to the width of the first sub-word of the mantissa.

In some embodiments, the adding of the first partial product and the second partial product includes performing an offset addition in the first offset adder.

In some embodiments, the forming of the first set of products further includes: multiplying, in a third multiplier, the first activation value by a least significant sub-word of a second weight of the first plurality of weights to form a first partial product; multiplying, in the third multiplier, the first activation value by a most significant sub-word of the second weight to form a second partial product; and adding the first partial product and the second partial product.

In some embodiments, the forming of the first set of products further includes: multiplying, in a fourth multiplier, the first activation value by a least significant sub-word of a third weight of the first plurality of weights to form a first partial product, the third weight having a most significant nibble equal to zero; and adding the first partial product and zero.

In some embodiments, the first activation value is a most significant sub-word of an integer activation value.

In some embodiments, the method further includes shifting the sum of the first partial product and the second partial product to the left by a number of bits equal to the size of the first activation value.

According to an embodiment of the present invention, there is provided a system, including: a processing circuit including: a first multiplier, a second multiplier, and a third multiplier, the processing circuit being configured to: form a first set of products, each product of the first set of products being an integer product of a first activation value and a respective weight of a first plurality of weights; and form a second set of products, each product of the second set of products being a floating-point product of a second activation value and a respective weight of a second plurality of weights, the forming of the first set of products including: multiplying, in a first multiplier, the first activation value by a least significant sub-word of a first weight of the first plurality of weights to form a first partial product; multiplying, in a second multiplier, the first activation value by a most significant sub-word of the first weight to form a second partial product; and adding the first partial product and the second partial product, the forming of the second set of products including: multiplying, in the first multiplier, the second activation value by a first sub-word of a mantissa of a first weight of the second plurality of weights to form a third partial product; multiplying, in the second multiplier, the second activation value by a second sub-word of the mantissa to form a fourth partial product; and adding the third partial product and the fourth partial product.

In some embodiments, the second activation value is a nibble of a mantissa of a floating-point activation value.

In some embodiments, the difference between the significance of the first sub-word of the mantissa and the significance of the second sub-word of the mantissa is equal to the width of the first sub-word of the mantissa.

In some embodiments, the adding of the third partial product and the fourth partial product includes performing an offset addition in a first offset adder.

In some embodiments, the offset of the offset adder is equal to the width of the first sub-word of the mantissa.

In some embodiments, the adding of the first partial product and the second partial product includes performing an offset addition in the first offset adder.

In some embodiments, the forming of the first set of products further includes: multiplying, in a third multiplier, the first activation value by a least significant sub-word of a second weight of the first plurality of weights to form a first partial product; multiplying, in the third multiplier, the first activation value by a most significant sub-word of the second weight to form a second partial product; and adding the first partial product and the second partial product.

In some embodiments, the forming of the first set of products further includes: multiplying, in a fourth multiplier, the first activation value by a least significant sub-word of a third weight of the first plurality of weights to form a first partial product, the third weight having a most significant nibble equal to zero; and adding the first partial product and zero.

In some embodiments, the first activation value is a most significant sub-word of an integer activation value.

According to an embodiment of the present invention, there is provided a system, including: means for processing, the means for processing including: a first multiplier, a second multiplier, and a third multiplier, the means for processing being configured to: form a first set of products, each product of the first set of products being an integer product of a first activation value and a respective weight of a first plurality of weights; and form a second set of products, each product of the second set of products being a floating-point product of a second activation value and a respective weight of a second plurality of weights, the forming of the first set of products including: multiplying, in a first multiplier, the first activation value by a least significant sub-word of a first weight of the first plurality of weights to form a first partial product; multiplying, in a second multiplier, the first activation value by a most significant sub-word of the first weight to form a second partial product; and adding the first partial product and the second partial product, the forming of the second set of products including: multiplying, in the first multiplier, the second activation value by a first sub-word of a mantissa of a first weight of the second plurality of weights to form a third partial product; multiplying, in the second multiplier, the second activation value by a second sub-word of the mantissa to form a fourth partial product; and adding the third partial product and the fourth partial product.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a processor for fine-grain sparse integer and floating-point operations provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
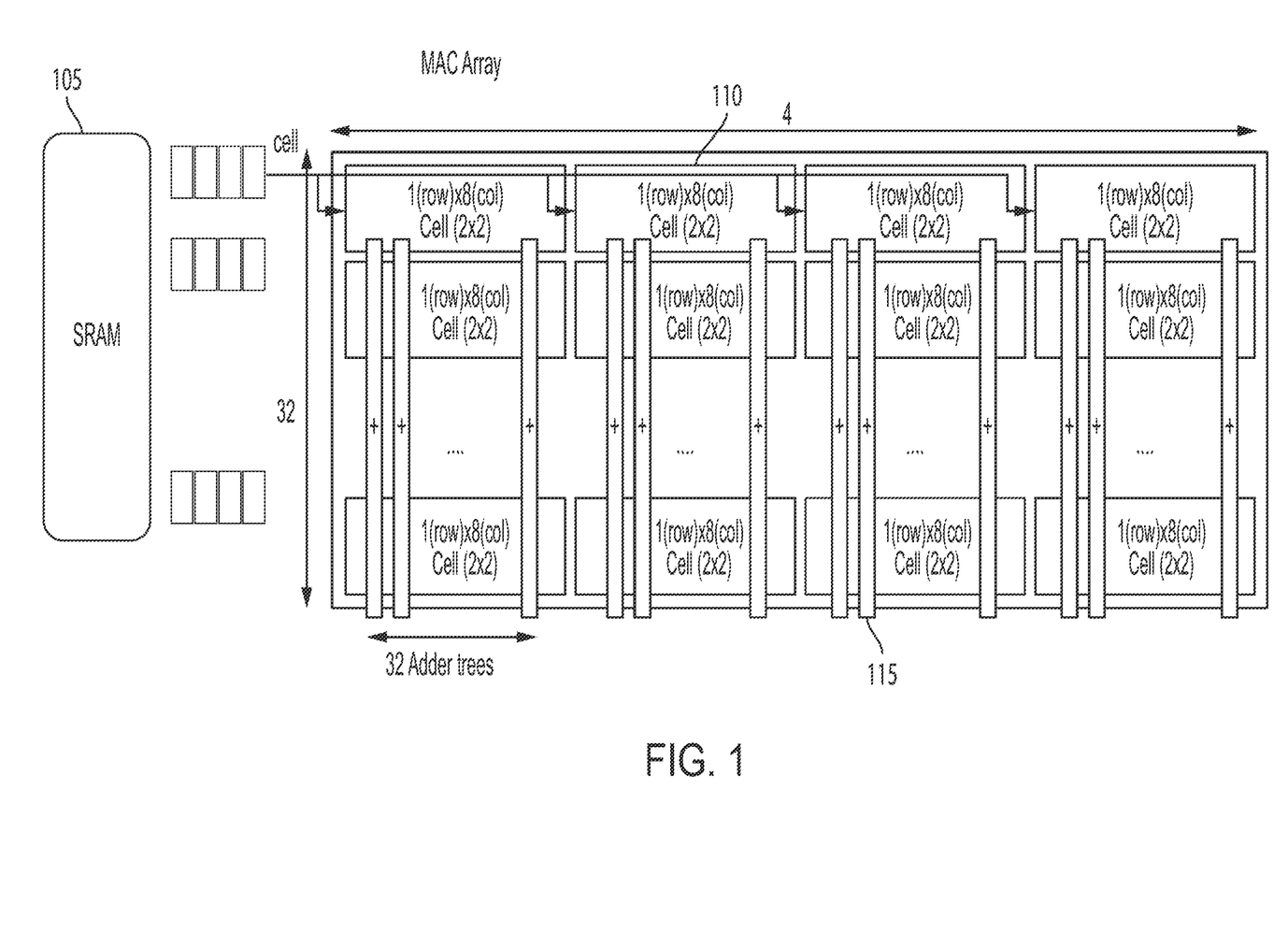
FIG. 1 is a block diagram of a portion of a neural network processor, according to an embodiment of the present disclosure.

A neural network (e.g., when performing inference) may perform voluminous calculations in which activations (or "activation values") (the elements of an input feature map (IFM)) are multiplied by weights. The products of the activations and weights may form multi-dimensional arrays which may be summed along one or more axes to form an array, or "tensor", that may be referred to as an output feature map (OFM). Referring to FIG. 1, special-purpose hardware may be employed to perform such calculations. Activations may be stored in a static random access memory (SRAM) 105 and fed into a multiplier accumulator (MAC) array, which may include (i) a plurality of blocks (which may be referred to as "bricks" 110), each of which may include a plurality of multipliers for multiplying activations and weights, (ii) one or more adder trees for adding together products generated by the bricks, and (iii) one or more accumulators for accumulating sums generated by the adder trees. Each activation value may be broadcast to a plurality of multipliers conceptually arranged in a row in the representation of FIG. 1. A plurality of adder trees 115 may be employed to form sums.

In operation, it may be that the weights fall within a range of values, and that the distribution of the values of the weights is such that relatively small weights are significantly more common than relatively large weights. For example, if each weight is represented as an 8-bit number, it may be that many of the weights (e.g., a majority of the weights, or more than ¾ of the weights) have a value of less than 16 (i.e., the most significant nibble is zero); the weights with nonzero most significant nibbles may then be referred to as "outliers". In some embodiments, suitably constructed hardware may achieve improved speed and power efficiency by taking advantage of these characteristics of the weights.

Figure 2A:
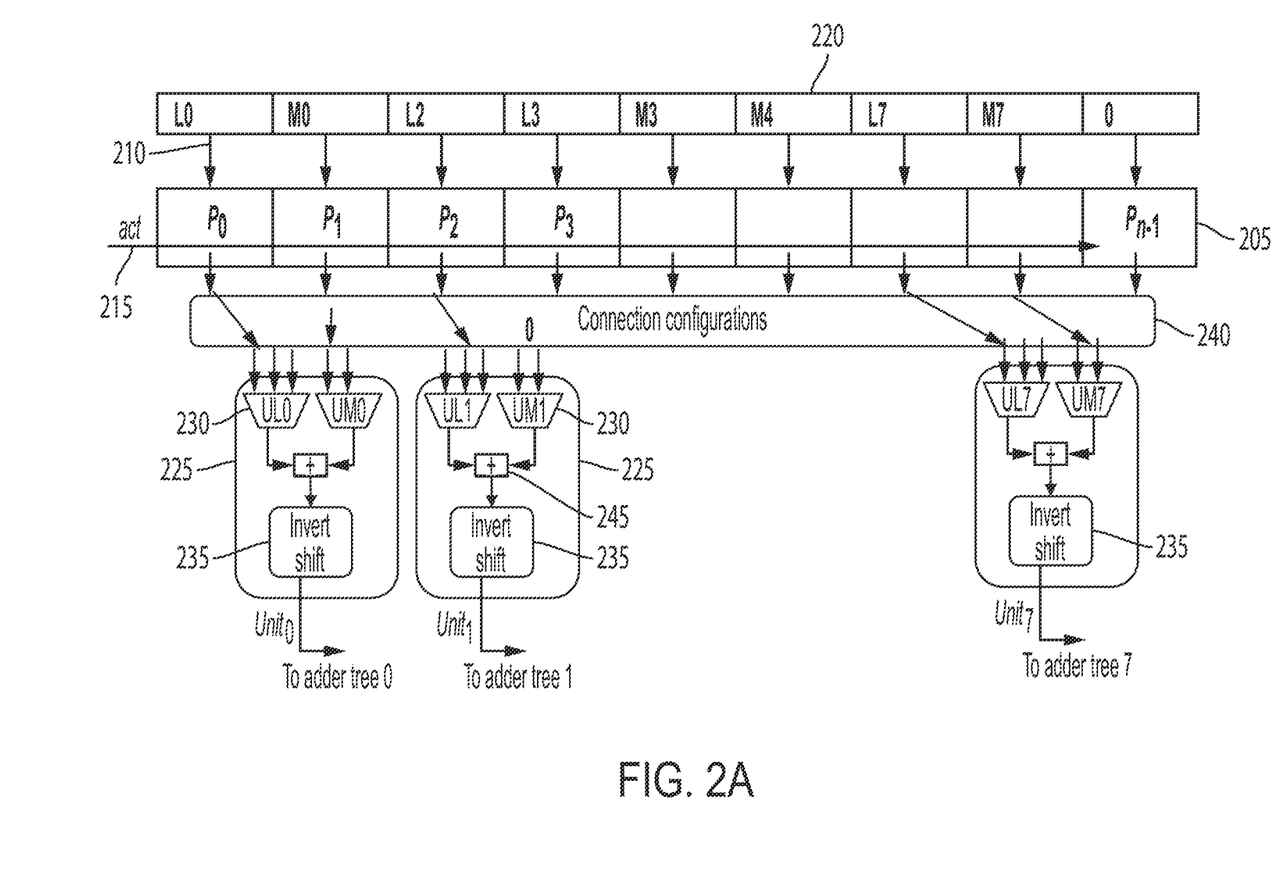
FIG. 2A is a block diagram of a portion of a mixed processing circuit, according to an embodiment of the present disclosure.

FIG. 2A shows a portion of a mixed processing circuit (referred to as "mixed" because it is suitable both for integer and for floating point operations). Referring to FIG. 2A, in some embodiments a plurality of multipliers 205 is used to multiply weights by activations, e.g., one nibble at a time. Each multiplier may be a 4×4 (i.e., 4-bit by 4-bit) multiplier with a first input 210 configured to receive a respective weight nibble, and a second input 215 configured to receive an activation nibble (which may be broadcast to all of the multipliers). An embodiment with nine multipliers is shown; in some embodiments more multipliers are present (resulting in a more capable, but costlier, circuit) and in some embodiments fewer multipliers are present (resulting in a less capable, and less costly, circuit). A weight buffer 220 (of which only the output row is shown) may include a respective register for each of the multipliers 205. The outputs of the multipliers 205 may be fed to a plurality of combining circuits 225, each of which may include one or more multiplexers 230, an adder, and an inverting-shifting circuit 235. The system may include the same number of combining circuits 225 as multipliers 205, or it may contain fewer combining circuits 225 than multipliers 205 (as shown), or it may contain more combining circuits 225 than multipliers 205.

In operation, each multiplier may produce, during each clock cycle, one partial product. These partial products may be added together to form integer products (which may also be partial products), each of the integer products may be processed by an inverting-shifting circuit 235, and the result may be sent to an adder tree to be added to other integer products. For example, as illustrated in FIG. 2A, the first two values in the output row of the weight buffer 220 may be the least significant nibble L0 and the most significant nibble M0 of a first weight, and the activation value nibble being broadcast may be the least significant nibble of a first (8-bit) activation value. The activation value nibble may be multiplied by the least significant nibble L0 of the first weight to form a first partial product P0, and the activation value nibble may be multiplied by the most significant nibble M0 of the first weight to form a second partial product P1. These partial products may be routed to a first combining circuit 225 (the left-most one in FIG. 2A) by the connection fabric 240. The connection fabric 240 may include the multiplexers 230; it is drawn in FIG. 2A as a separate element to facilitate the illustration (using arrows) of the data routing it performs. In the first combining circuit 225 the product of (i) (both nibbles of) the weight and (ii) the activation value nibble may be calculated as an offset sum (calculated by the corresponding offset adder 245) of the first partial product and the second partial product.

As used herein, an "offset sum" of two values is the result of "offset addition", which is the forming of the sum of (i) a first one of the two values and (ii) the second one of the two values, shifted to the left by a number of bits (e.g., by four bits), and an "offset adder" is an adder that performs the addition of two numbers with an offset (referred to as the "offset" of the offset adder) between the positions of their least significant bits. As used herein, the "significance" of a nibble (or, more generally, of a sub-word (discussed in further detail below)) is the position it occupies in the word of which it is a part (e.g., whether a nibble is a most significant nibble or a least significant nibble of an 8-bit word). As such, the most significant nibble of an 8-bit word has a significance four bits greater than the least significant nibble.

Each inverting-shifting circuit 235 may convert between (i) a sign and magnitude representation and (ii) a two's complement representation, and it may shift the result as needed for proper addition to occur in the adder tree. For example, if the activation value nibble is a most significant nibble, then the output of the offset adder 245 may be shifted (e.g., by 4 bits, to the left), so that, in the adder tree, the bits of the output will align properly with the bits of other products (e.g., with a product of a weight with a least significant nibble of an activation value). Conversion between sign and magnitude representation and two's complement representation may be performed, for example, if the multipliers 205 are unsigned integer multipliers, and the adder tree is a two's complement adder tree.

Figure 2B:
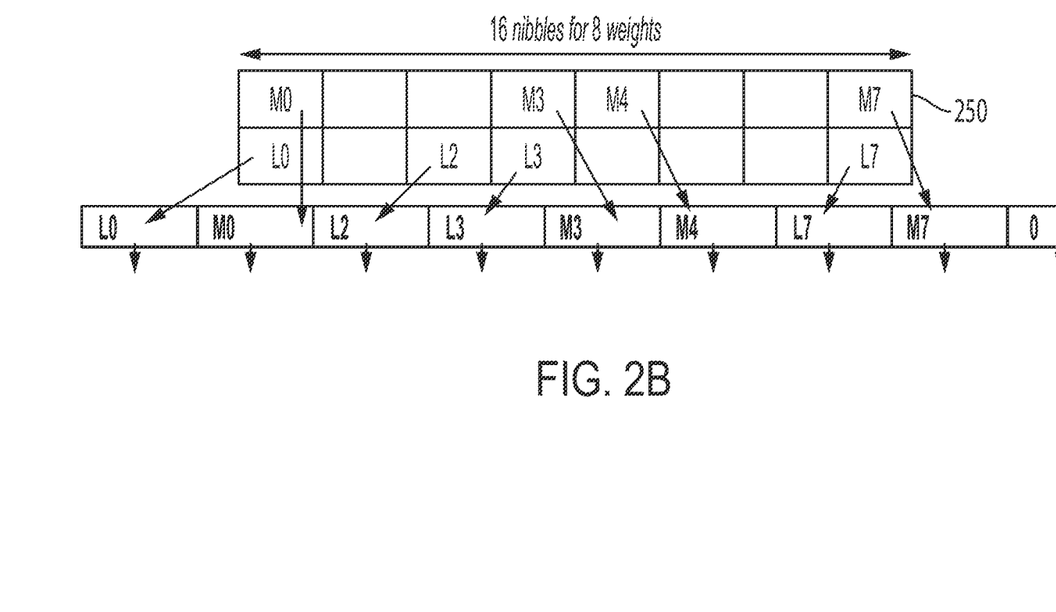
FIG. 2B is a data mapping diagram, according to an embodiment of the present disclosure.

The arrangement of the weight nibbles in the weight buffer 220 may be the result of pre-processing, as illustrated in FIG. 2B. The raw array of weights 250 may include a first row, of least significant nibbles (labeled "L0" and the like) and a second row, of most significant nibbles (labeled "M0" and the like), as illustrated. Some of the nibbles may be zero, as illustrated by the blank cells in FIG. 2B. Preprocessing may rearrange these nibbles in populating the weight buffer (as indicated, for example, by the arrows in FIG. 2B) so that the weight buffer contains a smaller proportion of zero-valued nibbles than the raw array of weights 250. In the example of FIG. 2B, eight weights (each consisting of a least significant nibble and a most significant nibble) are rearranged so that the zero-valued nibbles are discarded, and the non-zero nibbles are placed into eight locations of one row of the weight buffer (with a ninth location containing zero), so that, when this row of the weight buffer is processed by the array of nine multipliers 205 (FIG. 2A), eight of the multipliers are used, and only one (the ninth one) is unused. In some circumstances, the sparsity of the raw array of weights 250 may not be sufficient to allow all of the most significant nibbles to be in the same row of the weight buffer as the corresponding least significant nibbles, and some or all of the products may be formed in two clock cycles, with the activation value remaining the same for both cycles. The preprocessing may also generate a control signal array that may be used to control the connection fabric 240 (e.g., the multiplexers 230) so that each partial product is sent to the appropriate input of an offset adder 245 according to the significance of the factors that formed it.

Figure 2C:
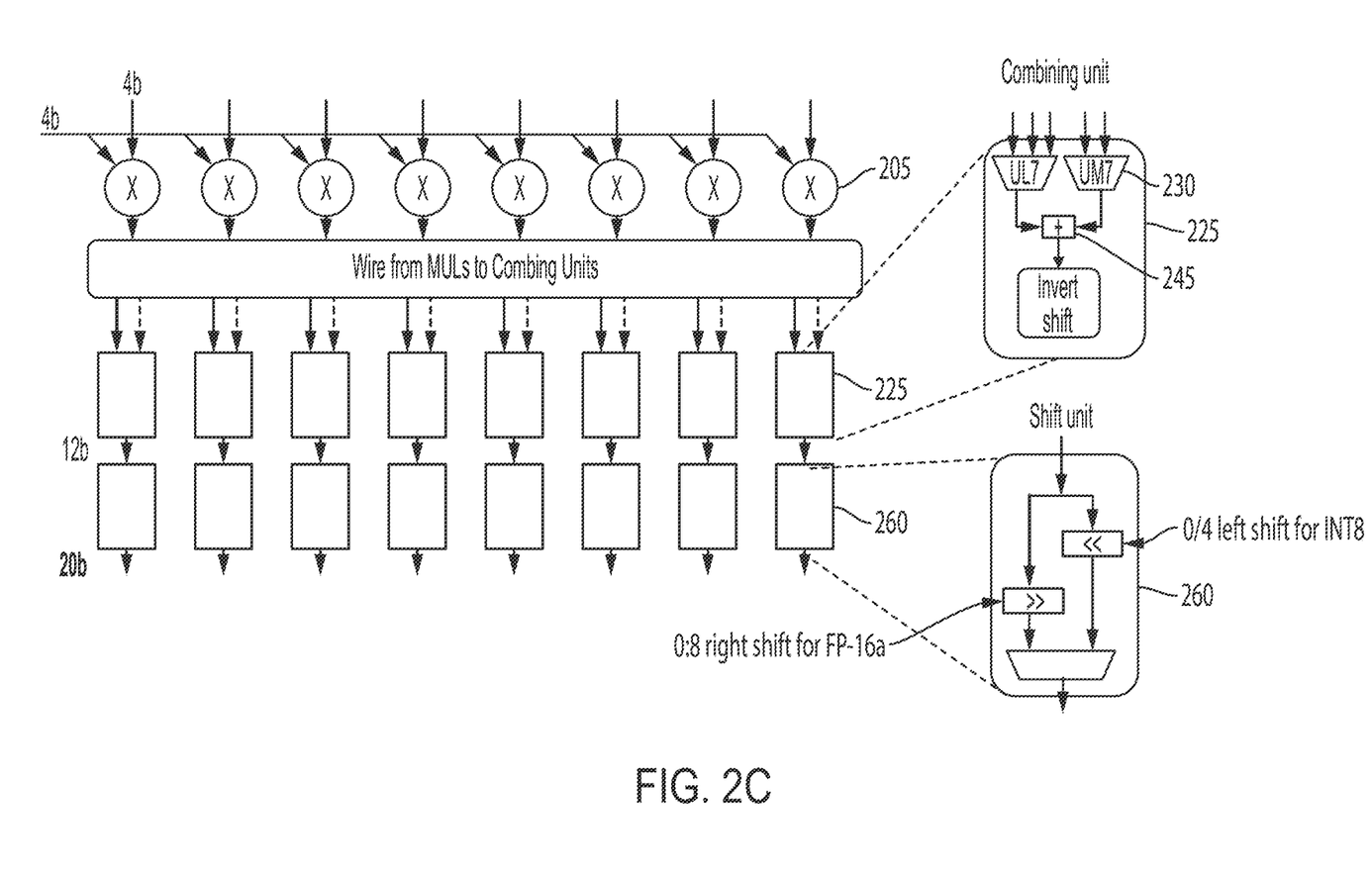
FIG. 2C is a block diagram of a portion of a mixed processing circuit, according to an embodiment of the present disclosure.

As illustrated in FIG. 2C, the mixed processing circuit may further include a plurality of variable shift units (or "variable shift circuits") 260 which, in a floating-point mode of the mixed processing circuit, enable the mixed processing circuit to perform floating-point operations on floating-point activations and floating-point weights. Each such floating-point number may be an FP16 floating point number (using, e.g., a format according to the IEEE 754-2008 standard) having one sign bit, an 11-bit mantissa (or "significand") (represented by 10 bits and one implicit lead bit or "hidden bit"), and a five-bit exponent. The 11-bit mantissa may be padded with one zero bit and split into three nibbles, a "high" (most significant) nibble, a "low" (least significant) nibble, and a "medium" nibble (of intermediate significance) (so that concatenating the high nibble, the medium nibble, and the low nibble, in order, results in the 12-bit (padded) mantissa).

Floating-point multiplications may then be performed by the mixed processing circuit of FIG. 2C by forming partial products of the high, medium, and low nibbles of the mantissa of each weight with the high, medium, and low nibbles of the mantissa of the activation, one pair of nibbles at a time (e.g., multiplying one nibble of the weight by one nibble of the activation), in each of the multipliers 205. The (12 bit wide) output of each inverting-shifting circuit 235 may be fed to a respective variable shift unit 260 which, in floating-point mode, may shift the data it receives to the right by between 0 and N bits (where N may be 8, or a larger number, or smaller number, depending in part on the size of the mantissa used in the adder tree, which may be selected based on the accuracy to be achieved). Further selectable shifts are available by selecting one or the other input of the offset adder 245, and by selecting the amount of shift applied in the inverting-shifting circuit 235. As a result, the mixed processing circuit of FIG. 2C is able to produce a suitably aligned output for each combination of significances of the four input nibbles to the two multipliers 205 feeding any one of the offset adders 245 during a given clock cycle (subject to the constraint that the significance of the two input values to the offset adder 245—which shifts one input by four bits relative to the other—differs by four bits).

Figure 3:
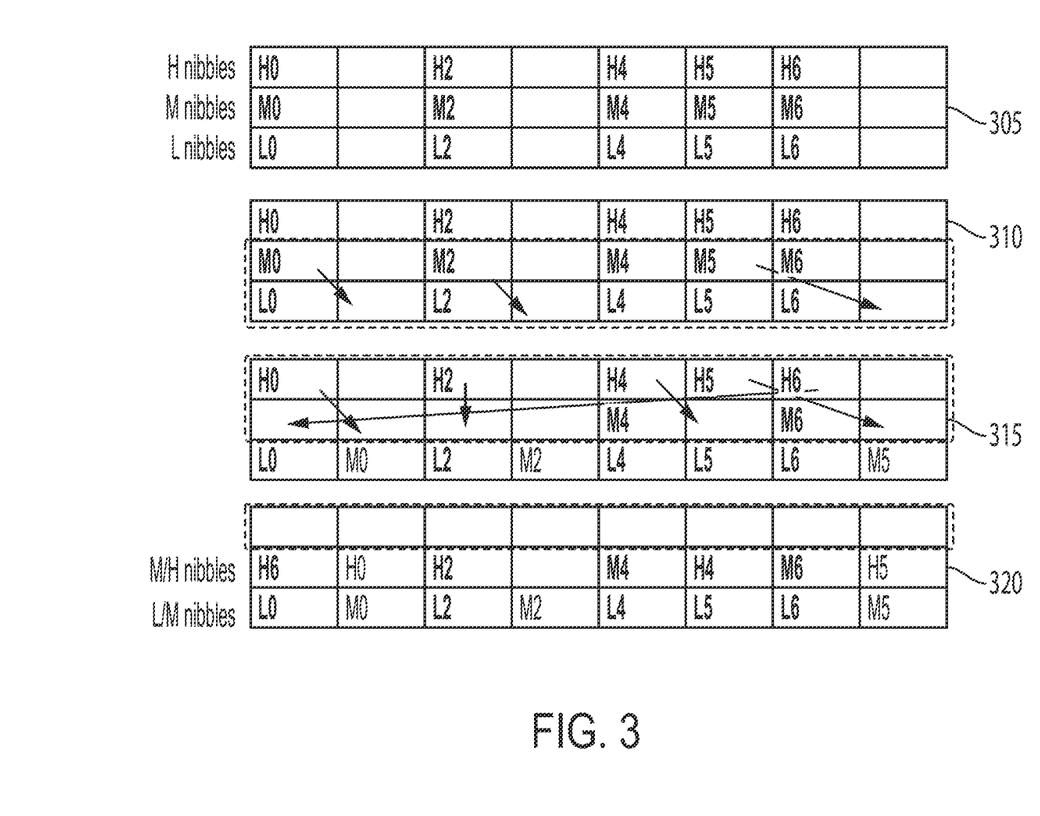
FIG. 3 is a data mapping diagram, according to an embodiment of the present disclosure.

FIG. 3 shows an example of preprocessing for an array of floating-point weights. In the floating-point representation, nibble sparsity (which may be relatively common for integer weights, with, e.g., a large fraction of the weights having a zero-valued most significant nibble) may be relatively rare, but a significant fraction of the weights may be equal to zero, with all three nibbles (low, medium, and high) being zero, as illustrated for the raw weight array 305. FIG. 3 shows how the three nibbles of the mantissa of each nonzero weight (weights 0, 2, 4, 5, and 6) may be rearranged, first to form a first intermediate matrix 310, then to form a second intermediate matrix 315, and then to form the final matrix 320, which may be suitable for storing in the weight buffer. In the final matrix, all of the nonzero elements are in the first two rows, and all of the products may be formed in two operations (e.g., in two clock cycles), whereas three operations would be used were the raw weight array 305 loaded into the weight buffer.

Although some examples are presented herein for an embodiment with 8-bit weights, 8-bit activation values, a weight buffer that is four weights wide, and weights and activations that may be processed one nibble at a time, it will be understood that these parameters and other like parameters in the present disclosure are used only as a specific concrete example for ease of explanation, and that any of these parameters may be changed. As such, the size of a weight may be a "word", for example, and the size of a portion of a weight may be a "sub-word", with, in the embodiment of FIG. 2A, the size of the word being one byte and the size of a sub-word being one nibble. In other embodiments, a word may be 12 bits and a sub-word may be six bits, for example, or a word may be 16 bits, and a sub-word may be one byte.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a processor for fine-grain sparse integer and floating-point operations have been specifically described and illustrated herein, many modifications and variations will be apparent to those skilled in the art. Accordingly, it is to be understood that a processor for fine-grain sparse integer and floating-point operations constructed according to principles of this disclosure may be embodied other than as specifically described herein. The invention is also defined in the following claims, and equivalents thereof.

What is claimed is:

1. A method for performing computations by a neural network via a processing circuit, the method comprising:
    identifying, by the processing circuit, a first plurality of weights having a first arrangement;
    generating, by the processing circuit, a first set of products, each product of the first set of products being an integer product of a first activation value and a respective weight of a first plurality of weights;
    generating, by the processing circuit, a second set of products, each product of the second set of products being a floating-point product of a second activation value and a respective weight of a second plurality of weights; and
    outputting, by the processing circuit, at least one of the first set of products or the second set of products for use by the neural network,
    the generating of the first set of products comprising:
        processing the first plurality of weights to have a second arrangement different from the first arrangement;
        storing the first plurality of weights arranged according to the second arrangement into a first memory space;
        multiplying, in a first multiplier, the first activation value by a least significant sub-word of a first weight of the first plurality of weights stored in the first memory space to form a first partial product;
        multiplying, in a second multiplier, the first activation value by a most significant sub-word of the first weight to form a second partial product; and
        adding the first partial product and the second partial product,
    the generating of the second set of products comprising:
        multiplying, in the first multiplier, the second activation value by a first sub-word of a mantissa of a first weight of the second plurality of weights to form a third partial product;
        multiplying, in the second multiplier, the second activation value by a second sub-word of the mantissa to form a fourth partial product; and
        adding the third partial product and the fourth partial product.

2. The method of claim 1, wherein the second activation value is a nibble of a mantissa of a floating-point activation value.

3. The method of claim 1, wherein a difference between a significance of the first sub-word of the mantissa and a significance of the second sub-word of the mantissa is equal to a width of the first sub-word of the mantissa.

4. The method of claim 1, wherein the adding of the third partial product and the fourth partial product comprises performing an offset addition in a first offset adder.

5. The method of claim 4, wherein an offset of the first offset adder is equal to a width of the first sub-word of the mantissa.

6. The method of claim 4, wherein the adding of the first partial product and the second partial product comprises performing an offset addition in the first offset adder.

7. The method of claim 1, wherein the generating of the first set of products further comprises:
    multiplying, in a third multiplier, the first activation value by a least significant sub-word of a second weight of the first plurality of weights to form a fifth partial product;
    multiplying, in the third multiplier, the first activation value by a most significant sub-word of the second weight to form a sixth partial product; and
    adding the fifth partial product and the sixth partial product.

8. The method of claim 1, wherein the generating of the first set of products further comprises:
    multiplying, in a fourth multiplier, the first activation value by a least significant sub-word of a third weight of the first plurality of weights to form a fifth partial product, the third weight having a most significant nibble equal to zero; and
    adding the fifth partial product and zero.

9. The method of claim 1, wherein the first activation value is a most significant sub-word of an integer activation value.

10. The method of claim 9, further comprising shifting a sum of the first partial product and the second partial product by a number of bits equal to a size of the first activation value.

11. A system for performing computations by a neural network, the system comprising:
    a processing circuit comprising:
        a first multiplier;
        a second multiplier; and
        a third multiplier,
    the processing circuit being configured to:
        identify a first plurality of weights having a first arrangement;
        generate a first set of products, each product of the first set of products being an integer product of a first activation value and a respective weight of a first plurality of weights;
        generate a second set of products, each product of the second set of products being a floating-point product of a second activation value and a respective weight of a second plurality of weights; and
        output at least one of the first set of products or the second set of products for use by the neural network,
    wherein in generating the first set of products the processing circuit is configured to:
        process the first plurality of weights to have a second arrangement different from the first arrangement;
        store the first plurality of weights arranged according to the second arrangement into a first memory space;
        multiply, in the first multiplier, the first activation value by a least significant sub-word of a first weight of the first plurality of weights stored in the first memory space to form a first partial product;
        multiply, in the second multiplier, the first activation value by a most significant sub-word of the first weight to form a second partial product; and
        add the first partial product and the second partial product,
    wherein in generating the second set of products the processing circuit is configured to:

multiply, in the first multiplier, the second activation value by a first sub-word of a mantissa of a first weight of the second plurality of weights to form a third partial product;

multiply, in the second multiplier, the second activation value by a second sub-word of the mantissa to form a fourth partial product; and add the third partial product and the fourth partial product.

12. The system of claim 11, wherein the second activation value is a nibble of a mantissa of a floating-point activation value.

13. The system of claim 11, wherein a difference between a significance of the first sub-word of the mantissa and a significance of the second sub-word of the mantissa is equal to a width of the first sub-word of the mantissa.

14. The system of claim 11, wherein in adding the third partial product and the fourth partial product the processing circuit is further configured to perform an offset addition in a first offset adder.

15. The system of claim 14, wherein an offset of the first offset adder is equal to a width of the first sub-word of the mantissa.

16. The system of claim 14, wherein in adding the first partial product and the second partial product the processing circuit is further configured to perform an offset addition in the first offset adder.

17. The system of claim 11, wherein in generating the first set of products the processing circuit is further configured to:

multiply, in the third multiplier, the first activation value by a least significant sub-word of a second weight of the first plurality of weights to form a fifth partial product;

multiply, in the third multiplier, the first activation value by a most significant sub-word of the second weight to form a sixth partial product; and add the fifth partial product and the sixth partial product.

18. The system of claim 11, wherein in generating the first set of products the processing circuit is further configured to:

multiply, in a fourth multiplier, the first activation value by a least significant sub-word of a third weight of the first plurality of weights to form a fifth partial product, the third weight having a most significant nibble equal to zero; and add the fifth partial product and zero.

19. The system of claim 11, wherein the first activation value is a most significant sub-word of an integer activation value.

20. A system for performing computations by a neural network, the system comprising:

means for processing, the means for processing comprising:
  a first multiplier;
  a second multiplier; and
  a third multiplier,
the means for processing being configured to:
  identify a first plurality of weights having a first arrangement;
  generate a first set of products, each product of the first set of products being an integer product of a first activation value and a respective weight of a first plurality of weights;
  generate a second set of products, each product of the second set of products being a floating-point product of a second activation value and a respective weight of a second plurality of weights; and
  output at least one of the first set of products or the second set of products for use by the neural network,
wherein in generating the first set of products the means for processing is configured to:
  process the first plurality of weights to have a second arrangement different from the first arrangement;
  store the first plurality of weights arranged according to the second arrangement into a first memory space;
  multiply, in the first multiplier, the first activation value by a least significant sub-word of a first weight of the first plurality of weights stored in the first memory space to form a first partial product;
  multiply, in the second multiplier, the first activation value by a most significant sub-word of the first weight to form a second partial product; and
  add the first partial product and the second partial product,
wherein in generating the second set of products the means for processing is configured to:
  multiply, in the first multiplier, the second activation value by a first sub-word of a mantissa of a first weight of the second plurality of weights to form a third partial product;
  multiply, in the second multiplier, the second activation value by a second sub-word of the mantissa to form a fourth partial product; and
  add the third partial product and the fourth partial product.

\* \* \* \* \*